Oct. 11, 1966

D. W. JEFFRIES 3,277,983

COMPENSATING BRAKE STRUCTURE

Filed Feb. 3, 1964

DAN W. JEFFRIES
INVENTOR.

BY Flam and Flam
ATTORNEYS.

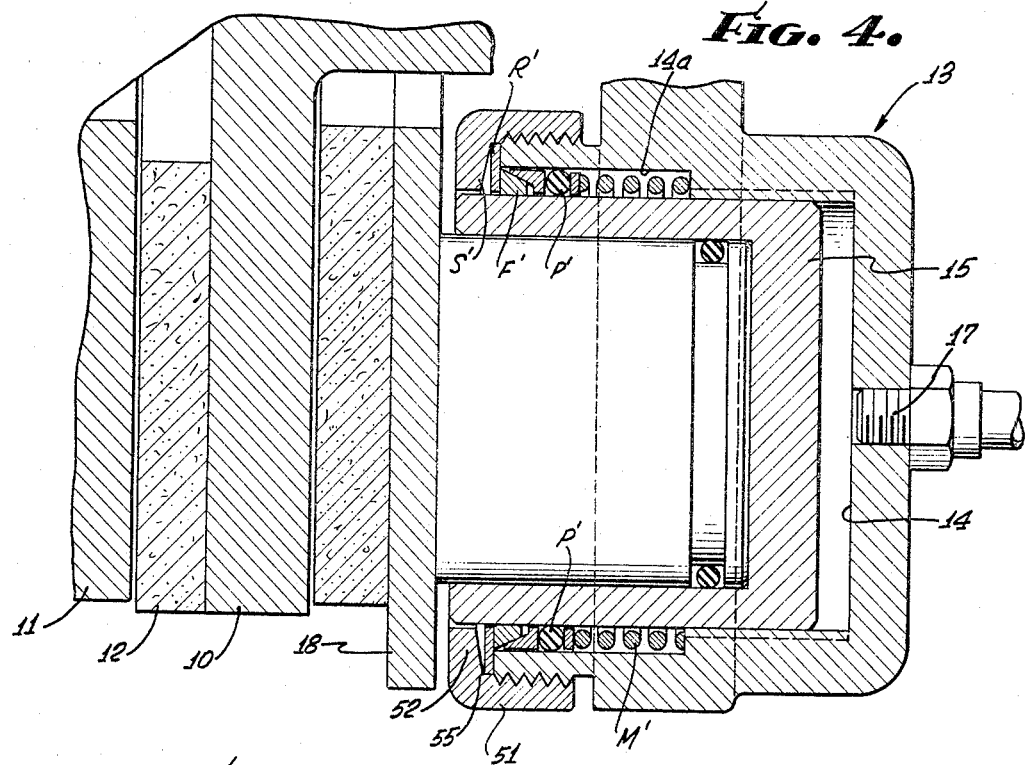
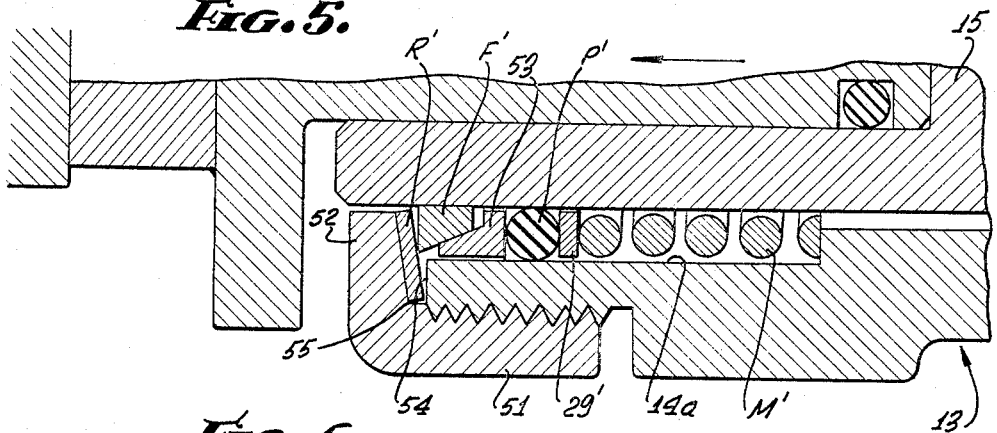
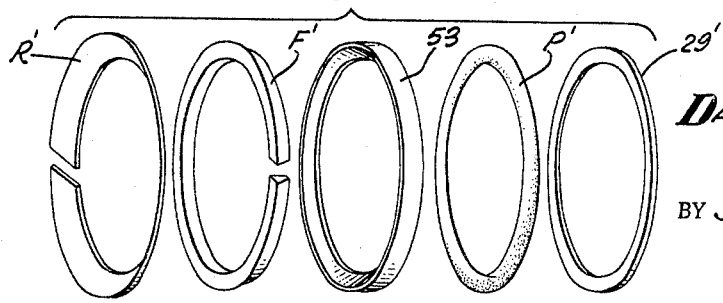
Dan W. Jeffries
INVENTOR.
BY Flam and Flam
ATTORNEYS.

Oct. 11, 1966 D. W. JEFFRIES 3,277,983
COMPENSATING BRAKE STRUCTURE
Filed Feb. 3, 1964 4 Sheets-Sheet 4

INVENTOR.
DAN W. JEFFRIES
BY Flam and Flam
ATTORNEYS.

United States Patent Office 3,277,983
Patented Oct. 11, 1966

3,277,983
COMPENSATING BRAKE STRUCTURE
Dan W. Jeffries, Los Angeles, Calif., assignor of one-half to Harold W. Nash, Los Angeles, Calif.
Filed Feb. 3, 1964, Ser. No. 341,953
15 Claims. (Cl. 188—196)

This invention relates to a compensating brake structure of the type shown and described in my prior United States Letters Patent No. 3,112,014 issued Nov. 26, 1963, entitled "Compensating Brake Structure."

In compensating brake structures such as shown in said patent, use is made of a supplemental piston for purposes of restoring a preset clearance when the brakes are released. The basic organization consists of a pair of relatively movable members in the form of a piston and a cylinder, friction means yieldingly griping or operative at one of the members, for example, the piston, a limited lost motion connection between the friction means and the other member or cylinder, a spring retracting the friction means from one limit corresponding to brake clearance, and a supplemental piston acted upon by the fluid pressure in the brake system for moving the friction means to its limit. When a slight brake pressure is applied, as for example twenty pounds per square inch, the piston and supplemental piston move together and the friction means moves against its stop. If at this time the brake lining is just engaged, then the system is in perfect adjustment. Upon further application of fluid pressure, as for example fifty pounds per square inch, the friction coupling yields and a braking force is applied. The various parts of the brake system may then deflect under the influence of such increased pressure. As the brake are released, the system pressure reduces to a valve less than fifty pounds per square inch, at which point there is minimal deflection in the parts, and the friction ring locks on the piston. Upon a further reduction in pressure below twenty pounds per square inch, the return spring retracts the friction ring and the main piston a preset amount. The required clearance accordingly exists.

It is of course desirable to maintain the designed clearance relationship during the periods when the brake is not used. However, various loads imposed upon the wheels, axles, king pins or the brake linings, as for example due to shock or other factors, may cause the piston to be moved inwardly. In such circumstances, the position of the friction means will be moved to a different adjusted position, and excessive clearance will be established. The operator of the brake system, expecting the brakes to be applied on a certain known movement of the brake pedal, will experience a large pedal displacement before braking action begins. Conceivably, it might be necessary for the brakes to be pumped before the requisite fluid is pumped into the system to cause the piston to operate the brake system. This, of course, is hazardous.

The primary object of this invention is to prevent temporary loads, such as shock loads, from disturbing the setting of the piston such that the brakes are always in properly adjusted condition. In order to accomplish this result, the return spring moves the friction means back against a spring or other resilient yielding stop rather than a fixed stop. Thus, if the piston is deflected inwardly, the friction means stays in its proper place. When the deflecting forces are removed, the resilient stop returns the piston with the friction means to the desired minimum clearance condition determined by the return spring without in any way having altered the critical relationship of the friction means. Accordingly, the resilient yielding stop serves as a means whereby the brake system "remembers" where it was set.

Another object of this invention is to provide a memory device of this character than can readily be incorporated in a brake structure in a simple manner.

The spring means serving to retract the friction means to its clearance position may, in certain installations, have to be quite strong; for example, because of a high back pressure incident to the design of the fluid pump system. If the return spring were too weak, then the high back pressure in the system would always cause the friction means to be held against its stop, and no retracting movement would be achieved. Furthermore, the friction ring must not yield its friction grip until the retracting spring has been collapsed against its stop, for otherwise the return spring would never operate to provide the requisite clearance. Accordingly, in certain installations it is necessary that the friction grip be very substantial. Accordingly, another object of this invention is to provide a compact friction ring structure capable of achieving very substantial gripping forces so that it may be adapted for use in various fluid pressure systems.

Still another object of this invention is to provide a memory system for use in an organization where the single sealing ring for the piston also forms the supplemental piston and in a manner generally similar to that shown and described in my prior Patent No. 3,112,014.

Still another object of this invention is to provide a simple means for coupling a pressure plate to a series of brake cylinder structures carried by a non-rotary support.

This invention possesses many other advantages, and has other objects which may be made more clearly apparent from a consideration of several embodiments of the invention. For this purpose, there are shown a few forms in the drawings accompanying and forming part of the present specification, and which drawings, unless described as diagrammatic, or less as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIG. 4 is an axial sectional view similar to FIG. 1, illustrating a modified form of the present invention;

FIG. 5 is an enlarged fragmentary sectional view illustrating a portion of the apparatus shown in FIG. 4;

FIG. 6 is an exploded pictorial view illustrating several of the components of the apparatus;

Figure 1:
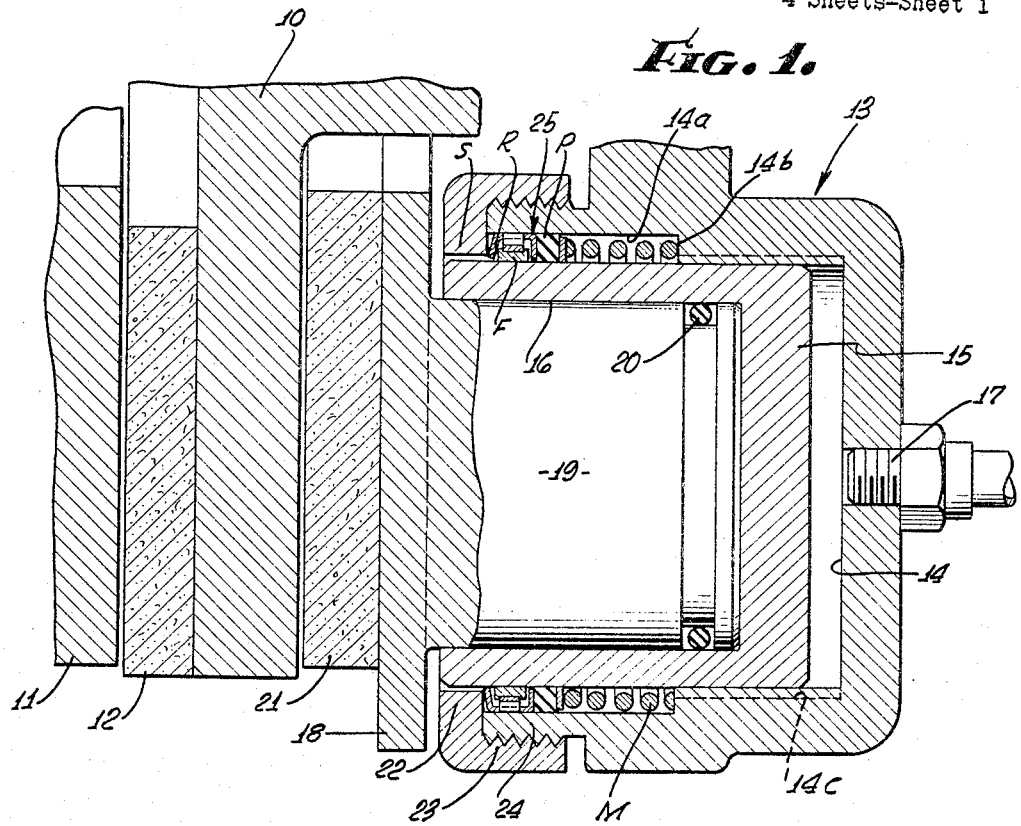
FIGURE 1 is an axial sectional view showing a brake system incorporating the present invention.

In FIG. 1 there is illustrated a rotary brake disc 10 that may be spline-connected to the wheel or other rotary device intended to be braked. On one side of the disc is a non-rotary reaction member 11 engaged by a friction lining material 12 carried by the disc 10.

A non-rotary supporting structure 13 located on the opposite side of the disc 10 has a number of brake cylinders, for example, located in angularly spaced relationship about the axis of rotation of the device. Only one of such cylinders 14 is illustrated in FIG. 1.

The cylinder 14 slidably accommodates a piston 15 having an outwardly opening recess 16. The piston 15 and corresponding pistons of other cylinders are advanced toward the disc 10 and retracted therefrom all in unison. A fitting 17 conducts brake fluid to the bottom of the cylinder.

An arcuate pressure plate 18 has a plurality of substantially cylindrical projections, as at 19, respectively bottomed in the piston recesses, as at 16. The cylindrical projection 19 has an annular groove in which an O-ring 20 is accommodated whereby a friction coupling to the piston is achieved. Upon retraction of the piston 15, the pressure plate is carried along.

The arcuate pressure plate 18 carries a friction lining material 21 adapted to engage the rotary disc 10. As the pistons move, the pressure plate 18, disc 10 and reaction member 11 are moved together, and braking results. In other applications the member 11 may be provided with a plurality of brake cylinders, in which instance the disc 10 need not be splined to the rotary apparatus, but may be axially affixed to the rotary apparatus.

The brake cylinder 14 has an enlarged outer portion as at 14a, there being an outwardly facing shoulder 14b separating the inner and outer portions of the cylinder. In the present instance, the piston 15 is guided by the inner portion of the cylinder, whereas in other installations the piston 15 could be guided upon a central rod or stem projecting from the bottom of the cylinder.

The elements constituting the operative parts of the compensated return mechanism include a friction ring F gripping one of the two relatively movable members, in this instance the piston 15; a stop S carried by the other of the members, in this instance the support 13 in which the cylinder 14 is formed; a supplemental piston P for moving the friction ring F and the stop S together; and a return spring R for moving the friction ring F and the stop S apart. A resilient yielding stop or memory member M in the form of a light coil spring constitutes the final element of the essential combination. The friction ring F, the return spring R, the supplemental piston P and the memory device M are all accommodated in the annular space between the piston 15 and the enlarged outer portion 14a of the cylinder 14.

The stop S is formed as an inwardly extending integral flange 22 of a nut 23 that is threadedly mounted upon a tublar extension 24 of the support 13 and surrounding the outer end of the cylinder 14. The flange 22 has suitable clearance with respect to the piston 15.

The friction ring F may be formed as sintered iron or other suitable material that is split so as to allow it to be constricted about the exterior cylindrical surface of the piston 15. A ring 25 serves the purpose of constricting the friction ring F about the piston 15 in a manner presently to be described.

Figure 3:
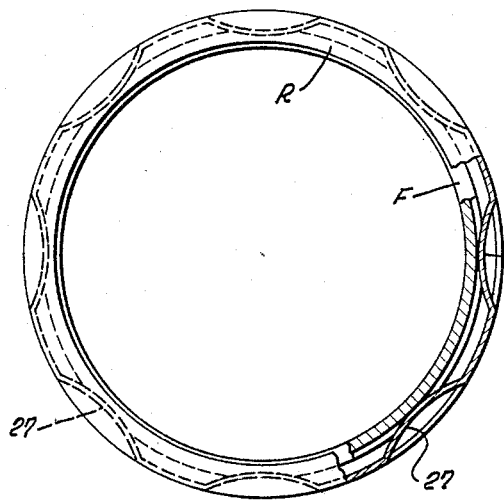
FIG. 3 is a plan view of the gripper ring and retainer, a portion of the gripper ring and retainer ring being broken away and illustrated in section.
Figure 2:
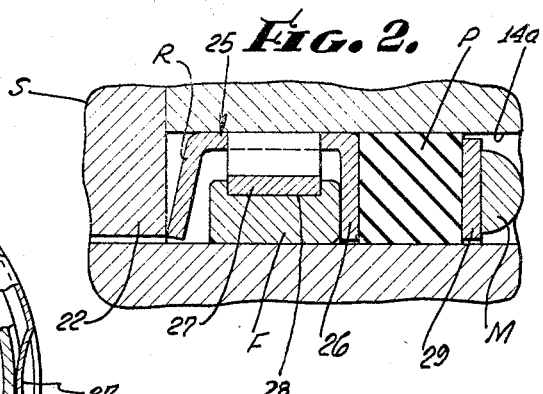
FIG. 2 is an enlarged fragmentary sectional view showing a part of the apparatus of FIG. 1.

The constricting ring 25, which may be made of high-tempered spring steel or the like, surrounds the piston 15 and the friction ring F and it has a channel-like configuration, as shown in FIG. 2, opening in an inward direction. The constricting ring 25 has running clearance in the enlarged portion 14a of the cylinder 14. The return spring R constitutes one side wall of the channel and a flange 26 forms the other. Struck inwardly from the connecting portion of the channel-like constricting ring 25 is a plurality of bowed springs 27, in this instance eight in number as shown in FIG. 3. The central portions of the springs engage the periphery of the friction ring F. Since both ends of each of the bowed springs 27 are fixed, they are capable of exerting a substantial constricting force upon the friction ring F.

The central portion of the bowed springs 27 projects into a shallow peripheral groove 28 of the friction ring F. Accordingly, the constricting ring 25 and the friction ring F are coupled for axial movement in unison.

The normal configuration of the return spring R is such that its central edge is outwardly offset from the peripheral base portion thereof. This inner central edge is opposed to the surface of the stop S. As the friction ring F is advanced with the piston 15, the edge of the return spring R engages the stop S until the spring is flattened against the stop S.

The supplemental piston P holds the friction ring F against the stop S (with the return spring R therebetween) whenever the system pressure is such that the force of the return spring R is overcome. This may be of the order of twenty pounds per square inch. The supplemental piston P is in the form of an O-ring having a square or rectangular configuration fitting both the enlarged cylinder portion 14a and the piston 15 such as to form a seal therebetween. The inner flange 26 of the constricting ring 25 has only slight clearance with respect to the piston 16, the clearance being exaggerated in FIG. 2. Furthermore, the corner at the base end of the flange 26 is quite sharp. Accordingly, the flange 26 provides a surface against which the supplemental piston P can react. In order to operate the supplemental piston P, the outer cylinder space is subjected to the fluid pressure of the system. This is achieved by virtue of a plurality of grooves 14c formed in the inner part of the cylinder 14. Fluid pressure accordingly acts not only over the entire area of the piston 15 but on the supplemental piston P.

When the parts are retracted and in properly adjusted position, the friction ring F is positioned away from the stop S by an amount corresponding to the stroke of the return spring R, and the lining 21 has its designed clearance relative to the disc 10. When fluid pressure is applied, the brake clearance is taken up, and the friction ring F has moved toward the stop S, almost entirely collapsing the return spring R. The pressure necessary to achieve this position is small, and corresponds to the force of the return spring, say 20 p.s.i.

When the brake pressure is increased to a reset value of say 200 p.s.i., a slight deflection of parts exists and the pressure excited by the supplemental piston itself is now adequate to hold the return spring entirely bottomed whatever the relative movement of the main piston 19 and the support 13 may be. Thus the parts may deflect more or less while the system pressure exceeds the reset value, but as soon as the pressure is reduced to the reset value, the friction ring F and the piston 19 lock together. At this reset pressure, a slight deflection remains. As the pressure is further reduced, the return spring R retracts the friction ring F together with the piston by a very small amount corresponding to a small fraction of the stroke of the return spring while the deflection reduces to zero. This occurs at about 20 p.s.i. Upon further reduction in pressure the return spring R completes its stroke and carries the piston back to achieve the desired clearance.

If clearance is inadequate, the piston engages before the friction ring F and return spring R have approached the stop S. As pressure is increased to the reset value, the friction ring F and the return spring R bottom against the stop S. Thereafter, the desired clearance will be established in a manner above described.

If clearance is excessive, and pressure of about 20 p.s.i. is applied, the friction ring F and return spring R approach the stop S while the piston has not yet engaged. As system pressure is increased, the force acting on the main piston is resisted only by the friction ring F. When the pressure builds up to approximately 40 p.s.i. the drag of the friction ring F is overcome and the clearance is taken up. Thereafter, the operation is as previously described.

There is in effect a lost motion connection between the friction ring F and the stop S, with the return spring R returning the friction ring from one of its limits.

The memory device or light coil spring M at one end engages a backing ring 29 on the inner side of the supplemental piston P and at one end of the shoulder 14b. The ring 29 has a running fit with the piston and cylinder adequate to contain the supplemental piston. The spring M provides a substantially constant preload on the O-ring P. This force urges the ring to engage the piston and cylinder to preclude leakage. Furthermore, since reliance is not placed upon the resilience and related characteristics of the ring to establish and maintain a seal, extremely close tolerances for the cylinder and piston diameters need not be specified. The spring M furthermore damps vibrations.

The memory device M forms a yielding stop to which the return spring normally retracts the friction ring F. Should a shock load be imposed upon the piston 15 tending to move it inwardly, the memory device M, since it is yielding, allows the friction ring F to move inwardly along with the piston. Accordingly, there will be no change in the relative position of the piston 15 and the friction ring F. When the deflecting forces are relieved, the memory device or spring M returns the parts to the position illustrated in FIGS. 1 and 2, and the preset clearance determined by the travel of the return spring will be reestablished.

In the form of the invention illustrated in FIGS. 4, 5 and 6, a somewhat similar arrangement is provided. The support 13, piston 15, pressure plate 18, cylinder space 14 with its enlargement 14a are provided as in the previous form. The return spring R', however, is separate and apart from a split gripper ring structure F', and in this instance the supplemental piston P' has a circular cross-section. The nut 51 has a flange 52 modified to provide a stop S' to cooperate with the return spring R'. The memory device M' is provided as before.

The friction gripper ring F' is constricted by a reaction ring 53 that has a close running fit with respect to the piston in the bore enlargement 14a. Formed peripherally on the friction ring F' is a conical surface nested in a conical seat of the reaction ring 53. The taper of the parts may be of the order of 8½° to 12°.

The return spring R' is split and is normally of bevelled ring configuration as illustrated in FIG. 6 with the central portion thereof normally projecting to the right or inwardly of the piston. The inside diameter of the ring R' is just slightly greater than the outside diameter of the piston 15. The peripheral portion of the spring ring R' is engaged at the corner 55 of the flange 52 and is confined against the end surface 54 surrounding the cylinder 14. The return spring R' is thus flattened against the surface and thus pretensioned. The inner portion of the spring R' projects inwardly of the cylinder.

The internal surface of the flange 52 is bevelled so as to permit the spring ring R' to be flexed outwardly at its center and further in opposition to its spring tension. It is so moved by the friction ring F' as the brake system is operated.

In the present organization, the memory spring M' performs the additional function of ensuring that a force is always applied between the friction ring F and the conical seat 53, irrespective of fluid pressure, be it positive or slightly negative. Thus the friction ring F' at all times grips the piston 15. Shock load imposed upon the piston 15 will also tend to wedge the friction ring in the seat 53, ensuring its continued grip upon the piston. Application of fluid pressure to the supplemental piston causes the friction ring F' to be wedged into position. Due to the memory device M', vibration will be ineffective to disturb the wedging relationship. Whenever the brakes are actuated, the wedging force is augmented. Compensation for any wear of the friction ring is achieved by virtue of the arrangement of parts.

Depending upon the degree of taper between the parts F' and 53, this frictional force may be predetermined. For a smaller taper, the friction gripping force is larger. A larger gripping force may be necessary in circumstances where there is a high back pressure in the system. Under such circumstances, the spring R' must exert a force adequate to overcome the back pressure. To ensure appropriate operation, the friction gripping force must always be greater than that of the return spring.

Figure 7:
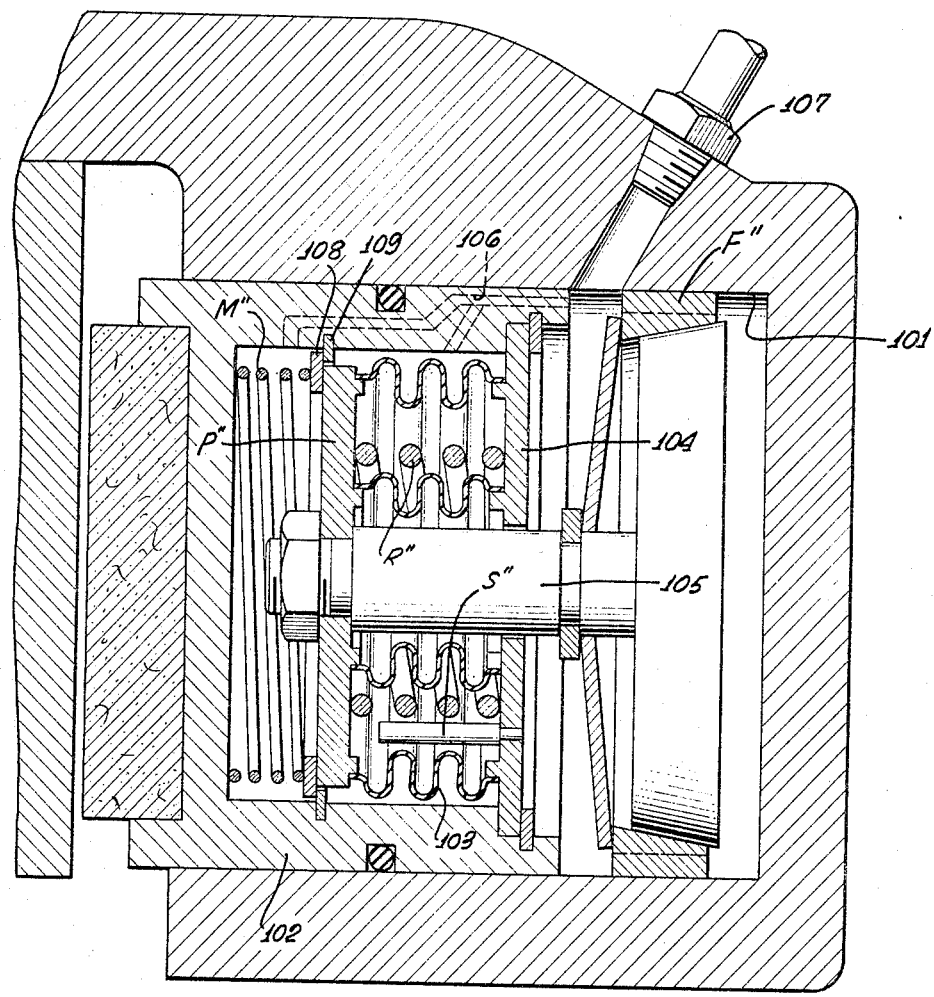
FIG. 7 is an axial sectional view showing a further modified form of the present invention.

The form of the invention illustrated in FIG. 7 is similar to that disclosed in my prior Patent No. 2,995,216. In this instance, the friction ring F'' is urged into engagement with the walls of a cylinder 101 in a manner described in said patent, rather than into engagement with the piston 102. The brake-operating piston 102 carries a bellows unit 103 having opposite end walls P'' and 104. One of the walls 104 is attached to the piston 102 and the other of the walls P'' is connected by the aid of a stem 105 to the friction ring F''. The friction ring F'' and the piston 102 are capable of limited relative movement as determined by a stop S'' carried by the wall 104 affixed to the piston 102. The wall P'' forms a supplemental piston operative between the friction member F'' and the piston 102. As fluid pressure is applied, the wall 104 and the supplemental piston P'' move to the limited position determined by the stop S''. Passages 106 conduct fluid to the supplemental piston or wall P from the fitting 107. A return spring R'' moves the piston 102 and friction member F'' away from the stop S'' when the fluid pressure is released, thus determining the appropriate clearance relationship.

A coil spring or memory device M'' urges a ring 108 against a snap ring 109 carried by the piston and forms a yielding stop to which the retracting spring R'' returns the parts. In the extended position shown, the retracting spring R'' and the bellows unit have both released their energy, and do not exert any force tending to overpower the spring M''. Should an undue shock load be imposed upon the piston P'' tending to move it inwardly, the memory device M'' yields, shielding the friction ring F'' from the imposition of such forces. The friction ring F'' thus maintains its adjusted position. When the shock load is relieved, the piston returns to the position illustrated, with the ring 108 against its snap ring 109, and an operation similar to that described in connection with the previous forms is achieved.

The memory device could be carried by parts attached to the friction ring F'' so as to be interposed between the piston and the friction ring with equal effect.

Figure 8:
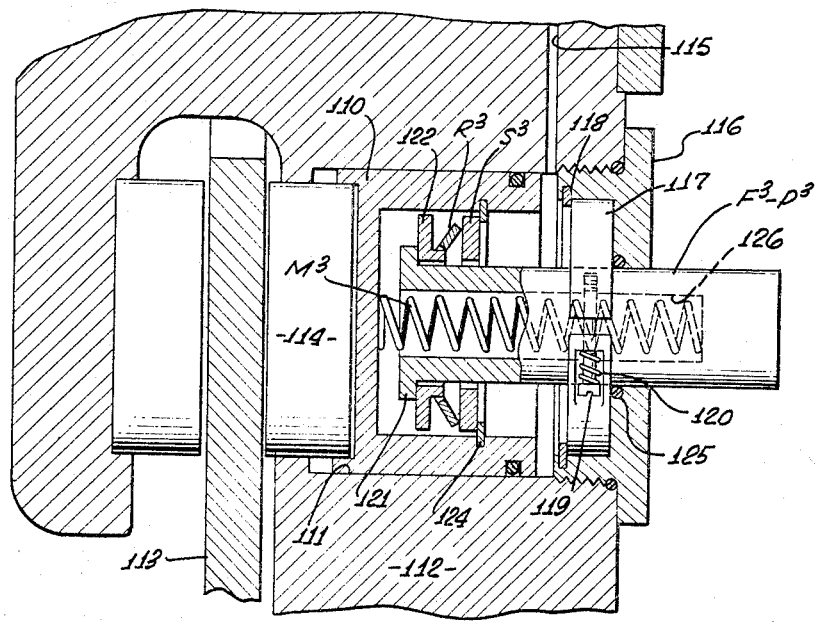
FIG. 8 is an axial sectional view showing a further modified form of the present invention.

In the form of the invention illustrated in FIG. 8, a brake operating structure, generally similar to that shown in Cagle Patent No. 2,997,138 is illustrated. A brake operating piston 110 is illustrated movable in a cylinder body member 112. A brake disc 113, which may be carried by the rotary apparatus (not shown), is engaged by a brake block 114 carried by the piston 110 when the brakes are applied. A conduit 115 passes fluid under pressure to the cylinder 111. The rear end of the cylinder 11 is closed by a cap 116.

A backing member $F^3$–$P^3$ projects through and is slidably mounted in the cap 116. Frictional resistance to the sliding action of the backing member $F^3$–$P^3$ is achieved by a split collar 117 held inside of the cap by a snap ring 118. The split collar 117 has a pair of spaced circumferential ends engaged by a headed screw 119 for drawing the ends of the collar together. A compression coil spring 120 underlies the head of the screw 119. Thus the backing member $F^3$–$P^3$ serves as a friction means yieldingly gripping the cylinder member 112.

A limited lost motion connection is established between the backing member $F^3$–$P^3$ and the piston 110. Thus the backing member $F^3$–$P^3$ has at its inner end a flange 121 against which is mounted a seating ring 122. The seating ring opposes an annular stop ring $S^3$ confined in the piston by a snap ring 124. The seating ring 122 has a hub part opposed to the stop ring $S^3$. When the backing member $F^3$–$P^3$ and the piston 110 are moved relative to each other in one direction, as for example when the brakes are applied, the seating ring 122 hits the stop ring $S^3$, whereupon the parts move in unison. The backing member $F^3$–$P^3$ and the piston 110 are moved away from the fixed limit when the brakes are released by the aid of a Belleville return spring R³ that is mounted upon the seat 122.

The backing member F³–P³ operates as a supplemental piston, collapsing the return spring R³. Thus opposite ends of the backing member are exposed respectively to the fluid pressure of the system and to the atmosphere. A sealing ring 125 carried by the cap 116 engages the backing member.

A memory spring M³, accommodated in an extended recess 126 at the inner end of the backing member, yieldingly holds the piston and backing member to the position determined by the travel of the return spring R³. One end of the spring M³ engages the bottom of the recess 126, and the other end engages the piston 110.

In normal operation, the structure depicted in FIG. 8 operates in the same manner as the structure shown in the Cagle Patent No. 2,997,138. However, in the event that an inward deflecting force is applied to the piston 110, it is free to move inwardly without disrupting the setting of the friction means F³–P³. Thus as the piston 110 moves inwardly, the memory spring M³ is compressed. When the deflecting force is removed, the memory spring M³ returns the parts to the position illustrated.

Figure 9:
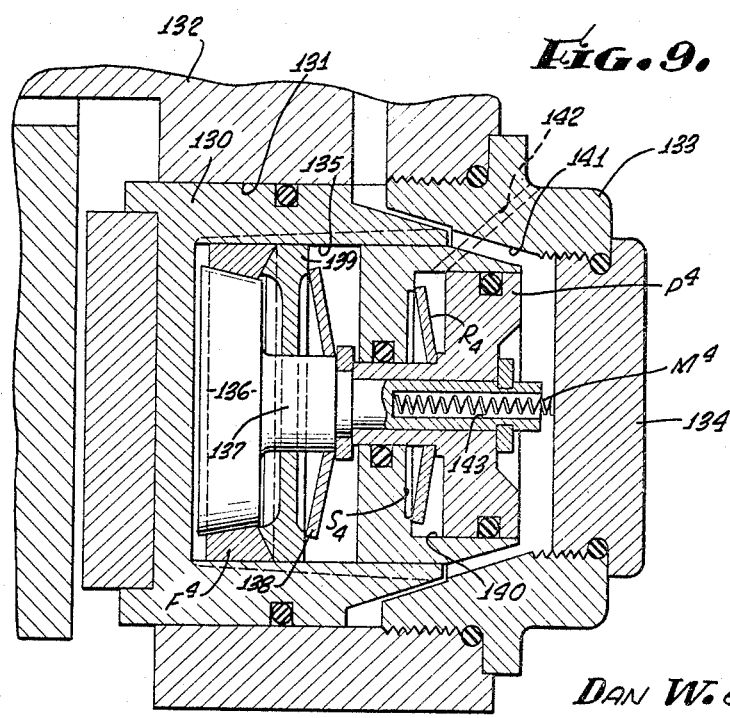
FIG. 9 is an axial sectional view showing a still further modified form of the present invention.

In the form of the invention illustrated in FIG. 9, a brake structure is illustrated that is similar to that shown in my prior patent No. 2,996,886. A piston 130 is slidably mounted in a cylinder 131 formed in a support or cylinder body member 132. A cover 133 and a cap 134 mounted on the cover 133 close the rear end of the cylinder 131.

A friction means F⁴ in the form of a ring yieldingly grips the walls of a central rearwardly opening recess 135 formed in the piston 130. The friction member F⁴ is mounted peripherally of a head 136. A stem 137 projects rearwardly of the head 136. A stiff spring washer 138 operating upon a pressure ring 139 actuates the friction means F⁴ so as to achieve the designed frictional interaction with the piston 130, and as more fully described in said prior patent No. 2,996,886.

The stem 137 projects into a supplemental cylinder space 140 formed in the cover 133. Upon the outer end of the stem 137, a supplemental piston P⁴ is mounted that works in the supplemental cylinder 140. The outer end of the supplemental piston P⁴ is exposed to the fluid pressure via suitable apertures, as at 141 in the cover 133. The opposite side of the piston P⁴ is subject to atmospheric pressure by the aid of a vent 142. A return spring R⁴ is operable between the bottom S⁴ of the cylinder 140 and the supplemental piston P⁴.

The friction means F⁴ has a limited lost motion connection with respect to the cylinder member 132. Thus movement of the friction member F⁴ to the left is limited by engagement of the supplemental piston P⁴ with the bottom S⁴ of the supplemental cylinder 140. Movement of the friction means F⁴ in the opposite direction is determined by the stroke of the return spring R⁴. A memory spring M⁴ yieldingly holds the parts at this opposite limit. The memory ring M⁴ is accommodated in an elongated recess 143 and acts upon the friction member F⁴ via the stem 139 and the cylinder member 132 via the cap 134.

In the event that a deflecting force is applied to the piston 130, the piston is free to move inwardly along with the friction means F⁴ without altering the adjusted position of the friction means F⁴. Thus upon such movement, the piston 130, the friction means F⁴ and the stem 139 together with the supplemental piston P⁴ simply move to the right and against the force of the memory spring M⁴. When the deflecting force is removed, the memory spring returns the parts to the position illustrated, pulling hydraulic fluid back into the cylinder. In other respects, the structure shown in FIG. 9 is similar to that described in said prior Patent No. 2,996,886.

The inventor claims:

1. In a brake structure: a piston member; a cylinder member; means guiding the members for relative movement in a path; friction means yieldingly gripping one of the members; means determining spaced limits for movement of the friction means relative to the other of said members, including a resiliently yielding element operative at one limit to enlarge the range of movement of the friction means relative to said other of said members; spring means for normally moving said friction ring toward said one limit; and a supplemental piston for urging the friction means toward said other limit.

2. In a brake structure: a piston member; a cylinder member; friction means yieldingly gripping one of the members; a lost motion connection between the friction means and the other of said members, including a relatively fixed stop means and a relatively yielding stop means respectively engaged by the friction means upon opposite movement of the friction means relative to the other of said members; a spring for normally positioning said friction means against the yielding stop means; and a supplemental piston for urging the friction means toward said relatively fixed stop means.

3. In a brake structure: a piston member; a cylinder member; friction means yieldingly gripping one of the members; means carried by the other of the members determining a limit to the movement of the friction means relative to the said other of said members while permitting relative movement between the members with slippage of said friction means; return spring means for relatively retracting said friction means a preset distance from said limit; a supplemental piston for moving the friction ring to said limit against the force of said return spring means; and yielding spring means for maintaining said friction means at said preset distance relationship with respect to said other of said members, and of inadequate size to overpower said return spring means.

4. In a brake structure: a brake cylinder; a brake operating piston guided for movement in the cylinder; a friction ring mounted on and yieldingly gripping the exterior surface of the brake operating piston and having at least running clearance in the cylinder; wall means carried by the cylinder determining an outward limit to the movement of the friction ring while permitting advancement of the brake operating piston; return spring means for retracting the friction ring a preset distance from its outward limit; a supplemental annular piston surrounding the brake operating piston and located in the cylinder inwardly of the friction ring for moving the friction ring to its outward limit; yielding spring means urging the supplemental piston outwardly, said yielding spring means exerting a force inadequate to overpower said return spring means; and means for conducting brake fluid to both pistons for simultaneous operation.

5. The combination as set forth in claim 4 in which said supplemental piston comprises a pliant sealing ring slidably movable along the piston and the cylinder for sealing the clyinder.

6. In a brake structure: a brake cylinder; a brake operating piston guided for movement in the cylinder; a split friction ring surrounding the piston; a constricting ring surrounding the friction ring and having a series of arcuate spring arms engaging the peripheral portion of the ring, said spring arms having confined ends whereby substantial contact pressure is developed between the spring arms and the friction ring; said rings having mutually engageable parts coupling them for movement in unison along with the piston; wall means carried by the cylinder determining an outward limit to the movement of said rings; return spring means for retracting said rings a preset distance from said outward limit; a supplemental annular piston surrounding the brake operating piston and located in the cylinder inwardly of the friction ring for moving the rings to said outward limit; and means for conducting fluid pressure to both pistons for simultaneous operation.

7. In a brake structure: a brake cylinder; a brake operating piston guided for movement in the cylinder; a split friction ring surrounding the piston; a constricting ring surrounding the friction ring and having a series of arcuate spring arms engaging the peripheral portion of the ring, said spring arms having confined ends whereby substantial contact pressure is developed between the spring arms and the friction ring; said rings having mutually engageable parts coupling them for movement in unison along with the piston; wall means carried by the cylinder determining an outward limit to the movement of said rings; said constricting ring having an integrally formed spring flange for retracting said rings a preset distance from said outward limit; a supplemental annular piston surrounding the brake operating piston and located in the cylinder inwardly of the friction ring for moving the rings to said outward limit; and means for conducting fluid pressure to both pistons for simultaneous operation.

8. In a brake structure: a brake cylinder; a brake operating piston guided for movement in the cylinder; a split friction ring surrounding the piston having peripheral groove means; a constricting ring surrounding the friction ring and having a series of arcuate spring arms fitting the groove means and constricting the friction ring about said piston, said spring arms having confined ends whereby substantial contact pressure is developed between the spring arms and the friction ring; said rings having mutually engageable parts coupling them for movement in unison along with the piston; wall means carried by the cylinder determining an outward limit to the movement of said rings; return spring means for retracting said rings a preset distance from said outward limit; a supplemental annular piston surrounding the brake operating piston and located in the cylinder inwardly of the friction ring for moving the rings to said outward limit; and means for conducting fluid pressure to both pistons for simultaneous operation.

9. In a brake structure: a brake cylinder; a brake operating piston guided for movement in the cylinder; a split friction ring surrounding the piston having peripheral groove means; a constricting ring surrounding the friction ring and having a series of arcuate spring arms fitting the groove means and constricting the friction ring about said piston, said spring arms having confined ends whereby substantial contact pressure is developed between the spring arms and the friction ring; said rings having mutually engageable parts coupling them for movement in unison along with the piston; wall means carried by the cylinder determining an outward limit to the movement of said rings; said constricting ring having an integrally formed spring flange for retracting said rings a preset distance from said outward limit; a supplemental annular piston surrounding the brake operating piston and located in the cylinder inwardly of the friction rings for moving the rings to said outward limit; and means for conducting fluid pressure to both pistons for simultaneous operation.

10. In a brake structure: a brake cylinder; a brake operating piston guided for movement in the cylinder; a split friction ring mounted on the exterior surface of said piston, said friction ring having a conical exterior surface; a reaction ring having a conical seat in which said friction ring is wedged whereby the friction ring is constricted to engage said piston; wall means carried by the cylinder determining an outward limit to the movement of the friction ring while permitting advancement of the brake operating piston; return spring means for retracting the friction ring a preset distance from its outer limit; a supplemental annular piston surrounding the brake operating piston and located in the cylinder inwardly of the friction ring for moving the friction ring to its outward limit; and means for conducting brake fluid to said pistons for simultaneous operation thereof.

11. In a brake structure: a brake cylinder; a brake operating piston guided for movement in the cylinder; a split friction ring mounted on the exterior surface of said piston said friction ring having a conical exterior surface; a reaction ring having a conical seat in which said friction ring is wedged whereby the friction ring is constricted to engage said piston; wall means carried by the cylinder determining an outward limit to the movement of the friction ring while permitting advancement of the brake operating piston; return spring means for retracting the friction ring a preset distance from its outer limit; a supplemental annular piston surrounding the brake operating piston and located in the cylinder inwardly of the friction ring for moving the friction ring to its outward limit; yielding spring means urging the supplemental piston and the friction ring outwardly and exerting a force inadequate to overpower said return spring means; and means for conducting brake fluid to both pistons for simultaneous operation.

12. In a brake structure: a brake cylinder; a brake operating piston guided for movement in the cylinder; a friction ring mounted on and yieldingly gripping exterior surface of the brake operating piston, and having at least running clearance with said cylinder; a nut mounted at the end of the cylinder and having a flange overlying the end of the cylinder; a spring ring having its outer portion confined against the end edges about said cylinder by said nut flange with the inner portion thereof in the path of outward movement of said friction ring; the inner portion of said spring ring being normally spaced from a surface of the nut flange but engageable therewith upon outward deflection of said spring ring; a supplemental annular piston for moving the friction ring outwardly and to deflect said spring ring; and means for conducting brake fluid to said pistons for simultaneous operation.

13. In a brake structure: a brake cylinder; a brake operating piston guided for movement in the cylinder; a split friction ring mounted on the exterior surface of said piston, said friction ring having a conical exterior surface; a reaction ring having a conical seat in which said friction ring is wedged whereby the friction ring is constricted to engage said piston; a nut mounted at the end of the cylinder and having a flange overlying the end of the cylinder; a spring ring having its outer portion confined against the end edges about said cylinder by said nut flange with the inner portion thereof in the path of outward movement of said friction ring; the inner portion of said spring ring being normally spaced from a surface of the nut flange but engageable therewith upon outward deflection of said spring ring; a supplmental annular piston for moving the friction ring outwardly and to deflect said spring ring; and means for conducting brake fluid to said pistons for simultaneous operation.

14. In a brake structure: a brake cylinder; a brake operating piston guided for movement in the cylinder; a friction ring mounted on and yieldingly gripping the exterior surface of the brake operating piston, and having at least running clearance with said cylinder; a nut mounted at the end of the cylinder and having a flange overlying the end of the cylinder; a normally conical spring ring having its outer portion confined against the end edges about said cylinder by said nut flange with the inner portion thereof in the path of outward movement of said friction ring; said conical flange being substantially flattened against said end edges to pretension said spring ring; the inner portion of said spring ring being normally spaced from a surface of the nut flange but engageable therewith upon outward deflection of said spring ring; said spring ring being so oriented that outward deflection of its inner portion is resiliently resisted, whereby a substantial restoring force may be achieved; a supplemental annular piston for moving the friction ring outwardly and to deflect said spring ring; and means for conducting brake fluid to said pistons for simultaneous operation.

15. In a brake structure: a piston member; a cylinder member; friction means yieldingly gripping one of the members; stop means carried by said other of said members for effectively engaging said friction means upon movement of the piston member in response to the application of fluid pressure between the members; a return spring for normally determining a preset clearance between said stop means and said friction means upon release of fluid pressure; a ballast or memory spring normally maintaining said stop means at a position determined by said return spring; and supplemental piston means for moving said stop means and said friction means together in response to the application of fluid pressure between the members.

References Cited by the Examiner

UNITED STATES PATENTS

| | | | |
|---|---|---|---|
| 2,996,886 | 8/1961 | Jeffries | 188—72 |
| 3,055,456 | 9/1962 | Pfeiffer | 188—73 |
| 3,064,765 | 11/1962 | Dotto | 188—73 |
| 3,112,014 | 11/1963 | Jeffries | 188—72 |
| 3,113,646 | 12/1963 | Airheart et al. | 188—72 |
| 3,122,222 | 2/1964 | Burnett et al. | 188—196 |
| 3,155,200 | 11/1964 | Halibrand | 188—196 |

DUANE A. REGER, *Primary Examiner.*